United States Patent
Raghavan et al.

(10) Patent No.: US 11,475,002 B1
(45) Date of Patent: Oct. 18, 2022

(54) MACHINE LEARNING SYSTEM FOR DYNAMIC GENERATION OF COMPUTER-IMPLEMENTED POLICIES

(71) Applicant: Amazon Technologies, Inc., Seattle, WA (US)

(72) Inventors: Srinivasan Sundar Raghavan, Mercer Island, WA (US); Daniel Micol-Ponce, Madrid (ES); Noelia Moron, Madrid (ES); Hersh Nagar, Snoqualmie, WA (US); Jaime Vallori, Seattle, WA (US); Vamsi Krishna Vutukuru, Sammamish, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 486 days.

(21) Appl. No.: 16/446,279

(22) Filed: Jun. 19, 2019

(51) Int. Cl.
  *G06F 16/00* (2019.01)
  *G06F 16/2453* (2019.01)
  *G06N 20/00* (2019.01)
  *G06F 16/2455* (2019.01)

(52) U.S. Cl.
  CPC .... *G06F 16/24534* (2019.01); *G06F 16/2455* (2019.01); *G06N 20/00* (2019.01)

(58) Field of Classification Search
  None
  See application file for complete search history.

(56) References Cited

U.S. PATENT DOCUMENTS

| | | | |
|---|---|---|---|
| 9,727,826 B1 * | 8/2017 | Lindstrom | H04L 67/10 |
| 2019/0108417 A1 * | 4/2019 | Talagala | G06K 9/6262 |
| 2019/0197244 A1 * | 6/2019 | Fong | G06F 21/577 |
| 2019/0236458 A1 * | 8/2019 | Taylor | G06N 5/022 |
| 2019/0311287 A1 * | 10/2019 | Chew | G06F 11/3495 |
| 2019/0362249 A1 * | 11/2019 | Rogynskyy | G06F 16/24575 |
| 2019/0377984 A1 * | 12/2019 | Ghanta | G06K 9/6259 |
| 2020/0112568 A1 * | 4/2020 | Pereira | H04L 63/0861 |
| 2020/0117817 A1 * | 4/2020 | Chen | G06F 21/6218 |
| 2020/0193313 A1 * | 6/2020 | Ghanta | G06N 20/00 |
| 2020/0341972 A1 * | 10/2020 | Buenrostro | G06F 16/273 |

* cited by examiner

*Primary Examiner* — Bai D Vu
(74) *Attorney, Agent, or Firm* — K&L Gates LLP (57) ABSTRACT

Devices and techniques are generally described for dynamic policy determination using machine learning. In some examples, first goal data may be received. A first machine learning model may generate a first computer-executable policy based at least in part on the first goal data. In some examples, a first search query may be received. In various examples, the first search query may be modified by the first computer-executable policy to generate a modified search query. In some examples, first feedback data related to user interaction with search results of the modified search query may be determined. In various examples, at least one parameter of the first machine learning model may be updated based at least in part on the first feedback data to generate a second machine learning model.

20 Claims, 6 Drawing Sheets

MACHINE LEARNING SYSTEM FOR DYNAMIC GENERATION OF COMPUTER-IMPLEMENTED POLICIES

BACKGROUND

Internet traffic may be routed to different web pages according to static, predefined policies. For example, web traffic may be directed to a particular webpage in order to satisfy a policy related to the webpage and/or content therein. In various examples, such policies may not reflect real time updates and/or current progress toward a goal for which the policies have been instituted. Institutional policies may be numerous and may not reflect changing and dynamic real world conditions. Additionally, such policies may rely on post-facto analysis to determine whether the policy is well-suited to an underlying goal. Since the environment in which the policies are applied is dynamic, the policies are often not fully optimized to achieve the goal.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Described herein are machine learning techniques that may be used to dynamically filter search queries in accordance with various policies. Additionally, described herein are various systems effective to automatically determine policies based on user-specified goals. In various examples, the systems described herein may use machine learning techniques to dynamically update the policies based on feedback signals, such as signals indicating current progress toward the goal(s) and/or signals indicating current results of the dynamic filtering of search queries.

Institutional users of the various computing systems described herein may specify goals that may be translated, using machine learning techniques, into computer-executable policies that may be dynamically updated in response to feedback signals indicating real-time progress status (e.g., completion percentage) and/or real-time result data (e.g., data resulting from the policies). Goals may be associated with quantitative and/or qualitative attributes and/or dimensions. For example, a quantitative goal attribute may be a quantitative metric related to a number of hits on a specified web page for a given month (e.g., a quantitative attribute). A qualitative goal attribute may relate to a type of web page (e.g., a goal of directing website traffic towards a new service and/or product). Goals may be associated with constraints. Constraints may be elasticities associated with various attributes of the goal data. For example, there may be a goal that a certain amount of web traffic be directed to a particular type of web page within the current month. Various attributes may be associated with the goal and may be specified as goal data. For example, the type of website, the URL of the website, the type of goods and/or services described on the website, the 1 month time period, the latency of the website, a quality rating of an item displayed on the website, a price of a good or service sold by the website, etc., may be examples of attributes associated with the goal. Various constraints may be specified by the user surrounding such attributes. Such constraints may be, for example, acceptable tolerances surrounding one or more of the attributes. For example, a latency of 500 ms+/−200 ms, a quality score of X+/−Y, etc. In various examples, goal attributes may include time frames for goal completion (along with acceptable tolerances).

Additionally, while goals may be specified via a user interface provided by the various computing systems described herein, in at least some other examples, goals (e.g., goal data) may be provided through other means. For example, goal data may be provided through application programming interfaces (APIs) provided by the systems described herein. For example, a device installed in a factory may determine that a particular component is below an inventory threshold. Accordingly, one or more processors of the device may be effective to provide goal data through an API surrounding reordering of the component. In various examples, the attributes of the goal data may include various dimensions, such as specification of a target quality, a target quantity, a price goal, specifications of the component, a particular category of seller (e.g., a credentialed minority-owned business), restrictions (e.g., websites and/or domains that should not be visited, blocked content), etc., as goals. Additionally, constraints may be provided for one or more of the attributes and/or dimensions of the goal data, as described above. As used herein, an attribute may refer to a parameter of goal data (e.g., a specified website, identification of content to be promoted, a percentage increase in web traffic, etc.), while a dimension may refer to metadata associated with an attribute. For example, if the attribute is a particular website, dimension of the website may be a number of visits over a particular period of time, delivery times associated with an item on the website, etc. Goal data may comprise an identification of one or more attributes (e.g., an identification of content) and dimensions with respect to the one or more attributes (e.g., increase traffic to content by 10% over a specified time period). Identification of content may include content with characteristics specified by the goal data. For example, the goal data may specify that sellers associated with a less than 5% rate of return and a greater than 95% on-time delivery rating be emphasized. In the foregoing example, attributes of the goal data (e.g., the content) may include the sellers, the rate of return, and the on-time delivery rating, while dimensions may include the specification of <5% and greater than 95%. In some further examples, goal data may comprise an identification of content to be blocked A computer-implemented goals engine may be effective to receive the goal data (including the various attributes, constraints, and/or dimension data) and may be effective to generate feature vector data representing the goal data. The goals engine may comprise one or more machine learning models effective to receive featurized goal data as input and to generate one or more policies as output.

Generally, in machine learned models, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

In various examples, the machine learning models of the goals engine may be trained using training data comprising a set of goal data that have been annotated with policies associated with the goal data. In various examples, real-time signals may be used to continually update the machine learning models of the goals engine, as described in further detail below.

Policies may include a set of attributes and/or dimensions associated with the goal data along with runtime logic (e.g., computer-executable operations and/or instructions) and/or heuristics that may be used to achieve the goals specified on the front end. Policies may comprise computer-executable operations that may be executed in order to achieve the goal for which the policy has been implemented. For example, based on the goal data, a policy may determine a precomputed data set comprising a plurality of search results (e.g., in a data structure). The policy (or policies) may include operations effective to determine an inverted index comprising a mapping of one or more policies to content in a database so that content that is in accordance with the policy/policies is surfaced. When a downstream search query (e.g., in a search engine) is used to search for content specified in the database, the policy engine may modify the query during runtime so that the preferred content (according to the policy/policies) is surfaced, emphasized, ranked higher in a ranked list, etc.

After determining policies, an analytics system may determine downstream user interactions with content surfaced in accordance with the current policies. For example, a policy may direct internet traffic to sites associated with a particular entity. Accordingly, user search queries that are relevant in some way to that entity may be modified by the policy engine (e.g., according to precomputed data, such as an inverted index) so that results related to the entity specified in the policy are emphasized over those results that are not related to or are contrary to the policy. User interactions may include feedback data indicating what websites (among the websites provided as a result of the search query) that a user viewed, what websites the user was presented with and ignored, what websites the user interacted with (e.g., through purchases, downloads, etc.), how much time the user spent visiting a particular website, bounce rate, etc. Such signals may be provided to the goals engine in real time and may be used to dynamically update the goals engine. Updating the goals engine may include training new instances of the machine learning models (and/or retraining current models) used to generate policies. In addition, the analytics system may keep track of overall progress toward the goal and may provide such signals to the goals engine. The goals engine may use overall progress toward a particular goal to train/retrain machine learning models used to generate the policies.

For example, goal A may be to direct 100,000 visits to website A during the current month and goal B may be to direct 60,000 visits to website B during the current month. The goals engine may initially generate policies to direct traffic to website A and website B (over other websites) by, for example, modifying user search queries. Halfway through the month, feedback data from the analytics system may indicate that 85,000 visits have been made to website A, while only 13,000 visits have been made to website B. This feedback data may be used to retrain the machine learning model(s) determining the policies to generate updated/retrained machine learning models. Accordingly, after retraining the model(s) the goals engine may determine updated polices. The updated policies (which in turn may affect precomputes such as inverted indices and modification of search queries) may emphasize website B, based on the fact that goal A has nearly been reached.

Figure 1:
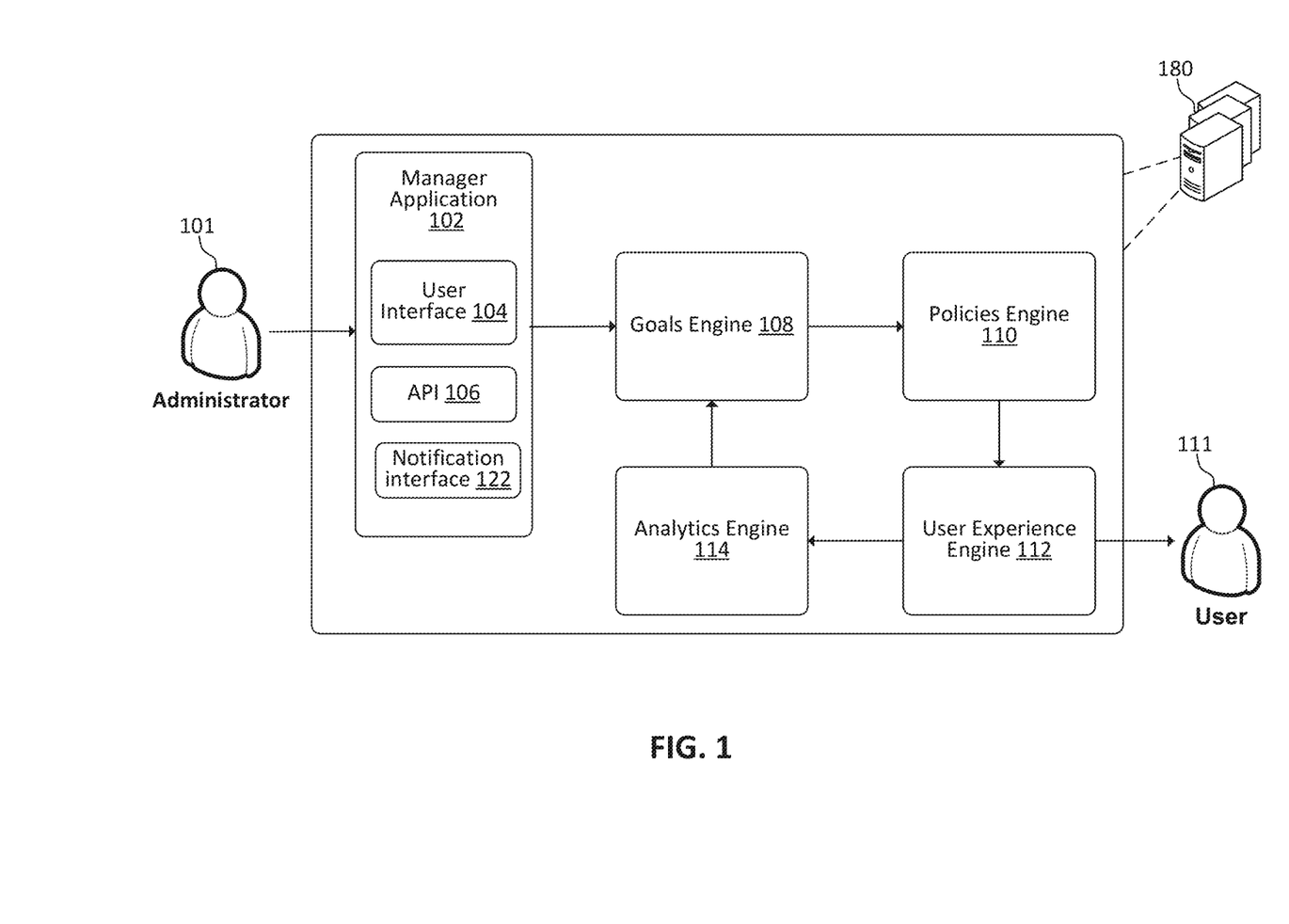
FIG. 1 is a diagram of a system architecture effective to determine and dynamically update policies based on specified goals, according to various embodiments of the present disclosure.

FIG. 1 is a diagram of a system architecture effective to determine and dynamically update policies based on specified goals, according to various embodiments of the present disclosure. The components of the system depicted in FIG. 1 may be executed by one or more computing devices 180. In various examples, computing devices 180 may be configured in communication via a network (e.g., a wide area network, such as the internet, and/or a local area network). As depicted in FIG. 1, a manager application 102 may be a web application and/or locally-executing software, comprising a plurality of non-transitory, computer-readable instructions that when executed by at least one processor of a computing device are effective to program the at least one processor to perform various methods and techniques described herein. For example, manager application 102 may include a user interface 104 through which an upstream user (e.g., administrator 101) may specify goals and/or intents on behalf of an institution. For example, as described above, goals may be quantitative and/or qualitative. Goals may include any number of attributes and/or dimensions. For example, the goal may be to achieve a 15% increase in web traffic directed to websites associated with minority-owned businesses over the next calendar year. The example goal includes the quantitative dimensions: 15% and 1 calendar year. Additionally, the example goal includes the qualitative attribute of a category (minority-owned businesses), along with the qualitative attributes of a time span, web traffic, an increase in web traffic, etc. User interface 104 may be a web-based interface (e.g., a browser-based interface), an application interface, a voice interface, etc.

In addition to the dimensions, the administrator 101 (or other user) may specify constraints related to the goal. For example, the administrator 101 may specify through user interface 104 a +/−3% tolerance for the 15% increase, may specify restrictions (e.g., prohibited websites to which traffic should not be sent), a cap on the amount of web traffic to any particular website, etc. In various examples, systems may be configured to automatically specify goals through application programming interface (API) 106. For example, various computing systems may be programmed with logic effective to define goals (including dimensions and/or constraints as described above) and to send data indicating the goals to manager application 102 through API 106.

Manager application 102 may represent goals (e.g., dimension data and/or constraint data) as goal data and may send goal data to goals engine 108. Goals engine 108 may be a backend system effective to receive goals data and/or feedback data and generate one or more polices based on the goals data and/or the feedback data. Data representing goals may be received by goals engine 108 from manager application 102. A feature representation (e.g., one or more feature vectors) representing the dimensions and/or constraints of the goals may be generated and/or extracted and may be input into one or more machine learning models of goals engine 108. The machine learning models may include deep neural networks trained in a supervised or unsupervised fashion to accept featurized goal data as input and to generate one or more policies that may be used to accomplish the goals. The policies may include definitions of the one or more attributes (e.g., specification of credentialed websites, specification of desired number of website visits during a particular time period, etc.), and/or custom logic that may be executed for the policy definition.

In various examples, the machine learning models employed by goals engine 108 may include recommender systems effective to form predictions based on past user behavior and/or the behavior of similar users. For example, collaborative filtering may be used to determine and recommend relevant content to users. In various examples, collaborative filtering techniques may include memory-based approaches and/or model-based approaches. In various examples, model-based approaches may include clustering algorithms (e.g., KNN), matrix factorization, and/or deep learning neural networks.

In at least some examples, manager application 102 and/or goals engine 108 may be effective to analyze goals data to determine if there is a similarity between one or more goals for which machine learning models have previously been instantiated. For example, if the goal is to increase website by 15% to a first website while maintaining a first level of latency, and a previous machine learning model has been deployed for the same goal (or a similar goal), the same machine learning model may be selected and deployed for the newly-received goal. Such cohort-based machine learning implementations may improve efficiency and may promote machine learning models that have been successful in the past.

Policies may be sent from the goals engine 108 to policies engine 110. Policies engine 110 may store and evaluate policies based on constraints specified in the goal data and/or in the policies themselves. Policies engine 110 may generate inverted indices comprising a mapping of one or more policies to content in a database so that content that is in accordance with the policy/policies is surfaced. In some other examples, policies may use heuristics and/or runtime logic to guide users toward content specified by the input goals.

User experience engine 112 may be a front end system that may be used by a user 111 of the system depicted in FIG. 1. User 111 may be, for example, an employee of an organization and/or entity supplying the goals to manager application 102 (e.g., through administrator 101). In various other examples, user 111 may be a user of a website and/or search engine provided by an entity associated with administrator 101. Administrator 101 may access user experience engine 112 through a web application interface (e.g., through an application interface and/or a browser-based interface). User experience engine 112 may execute policies stored by policies engine 110 to promote various content and/or web traffic in order to realize goals specified through manager application 102.

User experience engine may include a mobile interface, web application, programmatic APIs, Augmented reality/virtual reality interfaces, etc. In various examples, user experience engine 112 may execute policies stored by policies engine 110 to modify content (e.g., modify HTML and/or other code that cause content to be displayed by a browser) in order to emphasize goal completion. For example, user experience engine 112 may execute code that modifies the content displayed to a user such that only content compliant with goal completion is depicted. For example, content that is promoted by a current goal may be reordered by the computer-executable policy instructions to be displayed at the top of a search results page through code modification on the results page. In some further examples, content that is disfavored and/or prohibited by a current goal may be filtered out (e.g., removed from a list of results following a search query). In some further examples, preferred content may be tagged to indicate the preferred status. Similarly, disfavored content, blocked, and/or restricted content may be tagged to indicate the status of the content due to the current goal definition. Policies engine 110 may generate computer-executable instructions effective to cause modifications of the content as described herein. For example, policies engine 110 may modify HTML of the search results page and/or modify how a browser displays search results in order to modify the content in accordance with the active goal.

In some examples, content that is not compliant with an active goal may be blocked and/or diminished in visibility as compared to goal-compliant content. In various examples, content that is blocked may be displayed in a designated field such that the blocked content may be accessed if specifically selected. For example, a user may include search terms that identify a blocked product. While other products may be emphasized over the blocked product in the returned search results, a "Top blocked results" field, or other similar portion of the user interface, may display the top search results that have been blocked due to modification by the user experience engine 112 of the content returned from the search. Additionally, an option may be provided to show all results (and not only results that are goal-compliant).

Modification of returned content may relate to other goal attributes beyond specific web sites and/or products. For example, if free delivery is emphasized over paid delivery as a part of the goal, the user experience engine 112 may modify the returned content according to a current policy to emphasize and/or display only websites offering free delivery of the content and/or service.

Additionally, in examples where the user experience engine 112 relates to a different types of interfaces, different modifications may be appropriate. For example, in a voice interface context, emphasized items may be tagged using a special announcement from a voice assistant and/or may be listed first, prior to non-goal compliant content. Similarly, in a voice interface context, the user experience engine 112 may provide an audible indication of blocked content (e.g., a voice message indicating that particular content contravenes a current goal). In various other examples, user experience engine 112 may modify search results by including a widget at the top of the HTML results page, wherein relevant preferred content (according to a current goal/policy) is displayed within the widget. Additionally, user experience engine 112 may remove content from a results page that would be contrary to a current goal. In various further examples, the user experience engine 112 may modify details of a website of preferred content to include an emblem indicating that the content is preferred and/or an explanation of why the content is preferred (e.g., an identification of the goal and/or policy). In various further examples, the user experience engine 112 may modify existing advertising algorithms to prevent recommendation of blocked and/or restricted content that contravenes a current goal.

In another example, the user experience engine 112 may comprise an API used for automated procurement. In such examples, the user experience engine 112 may modify the external API content to interchange the compliance status of requested content so that appropriate actions may be taken in response by the appropriate administrator.

In some further examples, the user experience engine 112 may modify websites of blocked content to indicate similar content that is preferred in accordance with the current goal. In various examples, the user experience engine 112 may modify checkout and cart pages to prevent the user from purchasing blocked products when such products contravene the goal. Similarly, the user experience engine 112 may modify checkout and cart pages to prevent the user from selecting payment methods and/or delivery options that would contravene the goal. In some further examples, the user experience engine 112 may modify the ordering pipeline to force and/or bypass approval workflows depending on policies and current goal status.

In various examples, the user experience engine 112 and/or the policies engine 110 may generate an inverted index to promote content/attributes of a goal specified in the policy. During runtime, when user 111 submits a query for search, user experience engine 112 may modify the search query prior to execution in accordance with the policy to surface preferred content. For example, user experience engine 112 may add keyword search terms and/or search operators to the search such that content/websites specified in the policy are listed before content/websites that are not part of the policy. Accordingly, such content/websites are emphasized in order to realize the goal specified through manager application 102. Additionally, user experience engine 112 may modify content in accordance with one or more active goals as described above.

Analytics engine 114 may receive feedback data indicating user interactions with content (e.g., through an API). Analytics engine 114 may receive feedback from any type of user interface modified by user experience engine 112 (e.g., mobile interfaces, programmatic APIs, voice interfaces, augmented reality interfaces, virtual reality interfaces, etc.). User interactions may include feedback data indicating what websites (among the websites provided as a result of the search query) that a user viewed, what websites the user ignored, what websites the user interacted with (e.g., through purchases, downloads, etc.), data related to user interactions (e.g., how much time spent, quantity of an item purchased, purchase price, etc.) or lack of interaction, bounce rate, etc. The feedback data may be processed by analytics engine in order to aggregate the data by different dimensions (e.g., website visits within various different periods of time, numbers of visits to a particular type of website (e.g., websites classified as entertainment websites), interactions with various categories of objects associated with a website, etc.

Such signals may be provided to the goals engine 108 in real time and may be used to dynamically update machine learning models of the goals engine 108. Updating the goals engine 108 may include training new instances of the machine learning models (and/or retraining current models) used to generate policies. In addition, the analytics system may keep track of overall progress toward the goal(s) and may provide such signals to the goals engine 108 and/or to the manager application 102. The goals engine may use overall progress toward a particular goal to train/retrain machine learning models used to generate the policies. For example, Goal A may be to increase traffic to website A during the current year by 25% and goal B may be to increase visits to website B during the current month by 10%. The goals engine may initially generate policies to direct traffic to website A and website B (over other websites) by, for example, modifying user search queries. Halfway through the month, feedback data from the analytics system may indicate that visits to website A have increased by 30%, while visits to website B have only increased by 2%. This feedback data may be used to retrain the machine learning model(s) determining the associated policies. Accordingly, after retraining the model(s) the goals engine may determine updated polices that may emphasize website B over website A based on current progress toward the goal. In various examples, the updated policy may affect precomputes such as inverted indices and modification of search queries to emphasize website B over website A. Additionally, the current up-to-date progress may be provided to notification interface 122 of manager application 102. Notification interface 122 may be a progress dashboard effective to provide access to data indicating current progress toward any goals that have been input via user interface 104 and/or API 106 so that progress status data and/or completion status of the goals may be tracked by administrator 101.

Figure 2:
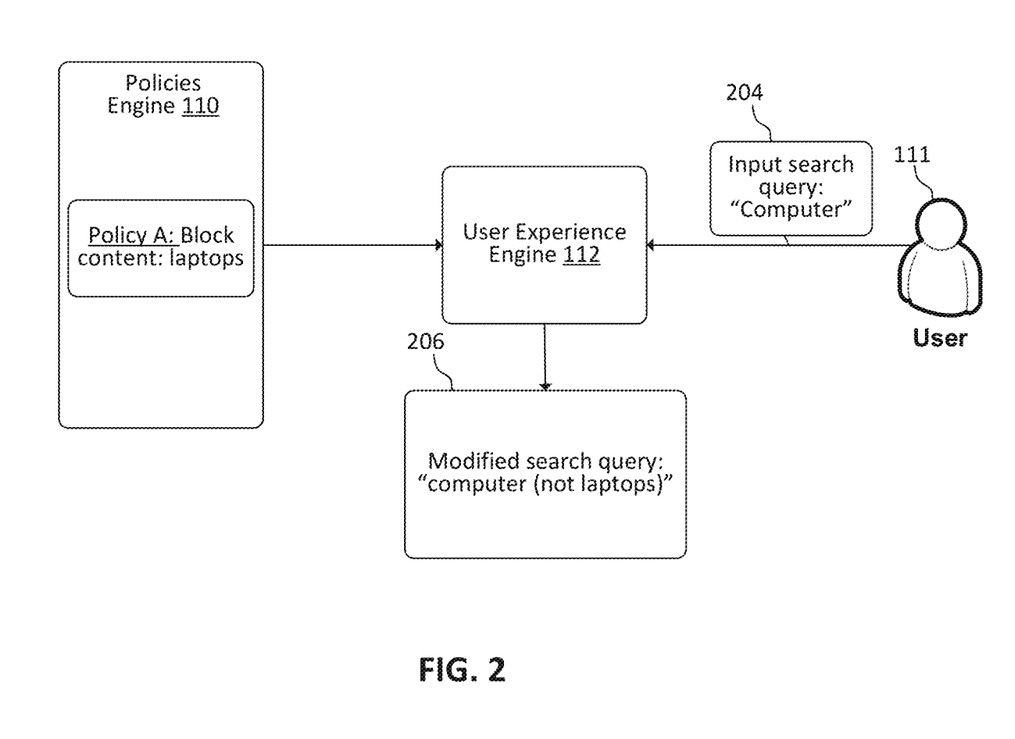
FIG. 2 depicts an example modification of a search query in accordance with a dynamically-determined policy, in accordance with various embodiments of the present disclosure.

FIG. 2 depicts an example modification of a search query in accordance with a dynamically-determined policy, in accordance with various embodiments of the present disclosure. In the example depicted in FIG. 2, a machine learning model of policies engine 110 has determined Policy A. Policy A may block the content "laptops." For example, a procurement officer of a user of the system may provide the goal of preventing the purchase of any further laptops for the current calendar year.

Accordingly, policy A may be determined by goals engine 108. Policies engine 110 may execute instructions of policy A that may be effective to modify search queries input by a user. In various examples, the user experience engine 112 may execute the instructions provided by policy A. In the examples depicted in FIG. 2, user 111 may input the search query "Computer" (input search query 204) as the user may be searching for computers. User experience engine 112 may intercept the search query and may modify the text string such that the search text string is "computer (not laptops)" in order to limit the results of the search query to avoid the blocked content—laptops. Accordingly, modified search query 206 may be "computer (not laptops)," as depicted in FIG. 2.

Thereafter, the search may be executed using the modified search query 206 and a list of results may be returned.

Analytics engine 114 (FIG. 1) may determine user interaction with the results. For example, analytics engine 114 may determine what search results were ignored and/or what websites among the search results the user 111 visited. Additionally, the analytics engine 114 may determine what content within a particular website the user 111 interacted with. Analytics engine 114 may provide such feedback data as a feedback signal to goals engine 108. Goals engine 108 may use the feedback signals to track goal progress and/or to update parameters (e.g., weights and/or biases) of machine learning models. In various examples, updating the machine learning models may, in turn, result in generation of new policies which may be sent to policies engine 110 to update, modify, and/or replace the current policies. Accordingly, policies may be dynamically updated in real time based on user interaction (and/or lack thereof) with surfaced content and/or based on current progress toward one or more goals.

In addition, analytics engine 114 may send goal data indicating current progress toward one or more goals to manager application 102. Notification interface 122 may provide access to data indicating current progress toward any goals that have been input via user interface 104 and/or API 106 so that progress status and/or completion status of the goals may be tracked by administrator 101. In various examples, data indicating current progress may be precomputed and/or segmented so that administrator 101 may track current goals based on categories of interest. For example, through notification interface 122, administrator 101 may obtain information describing how many visits have been made within a selected time period to a selected type of website. In other words, notification interface 122 may provide progress data segmentation so that progress data can be visualized according to a category of interest.

Figure 3:
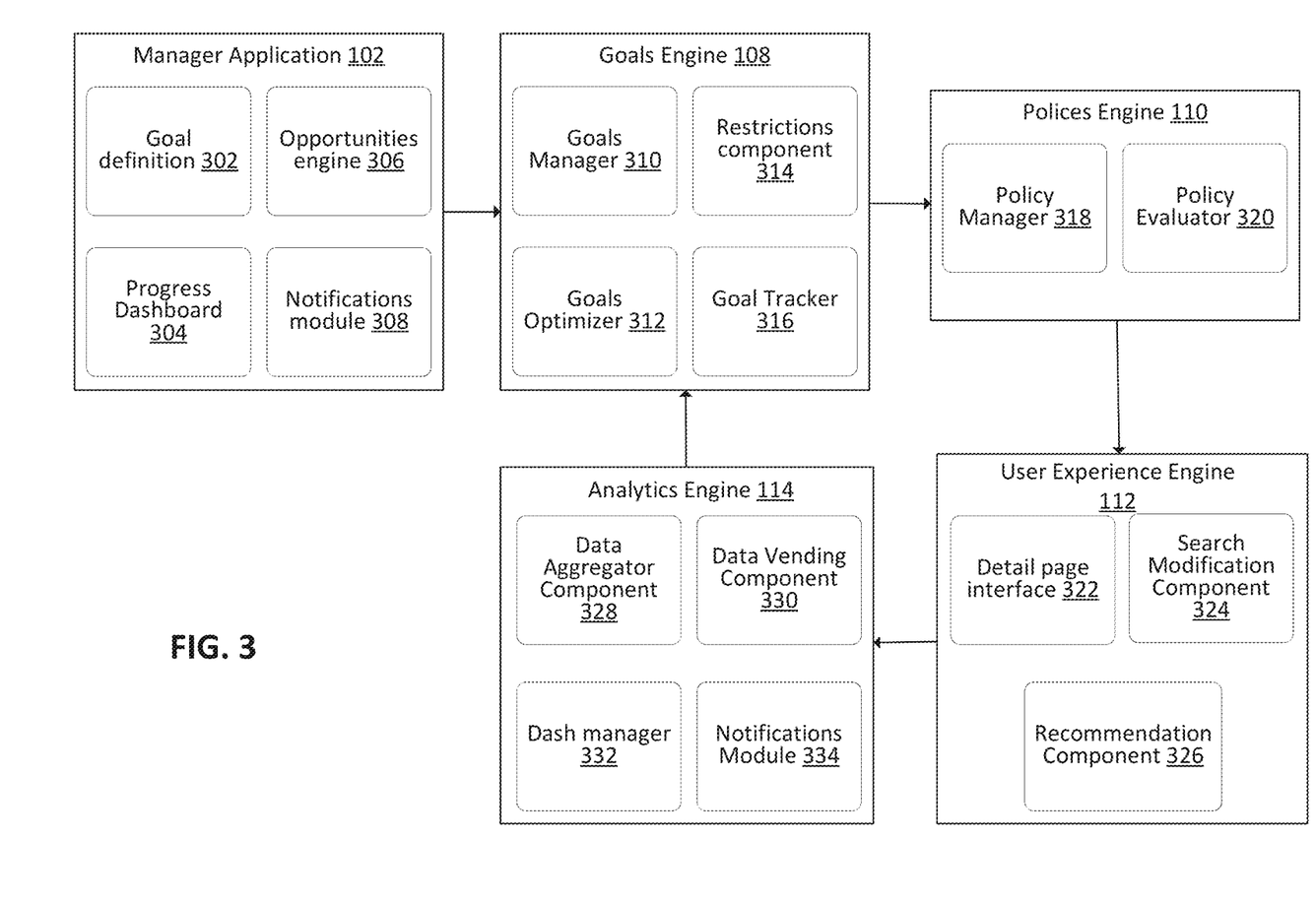
FIG. 3 is a diagram of the system architecture of FIG. 1 including additional details, according to various embodiments of the present disclosure.

FIG. 3 is a diagram of the system architecture of FIG. 1 including additional details, according to various embodiments of the present disclosure. As depicted in FIG. 3, manager application 102 may comprise a goal definition component 302. Goal definition component 302 may include user interface 104 and/or API 106 described in reference to FIG. 1. Goal definition component 302 may allow users (e.g., administrator 101) of the system to provide goals for which the system may dynamically and automatically create policies with which to promote accomplishment of the goals, as described herein.

Additionally, manager application 102 may comprise a progress dashboard 304. Progress dashboard 304 may provide access to goal completion status and/or progress status. Additionally, as previously described, progress dashboard 304 may segment progress data provided by analytics engine 114 so that progress may be viewed for different categories, over different time spans, and/or at different granularities.

In various examples, manager application 102 may comprise an opportunities engine 306. Opportunities engine 306 may suggest new goals based on a continuous analysis of the on-going and past goals, and/or based on user behavior with respect to current and/or past goals. In at least some examples, opportunities engine 306 may determine similarities between goal, policy, and/or behavior patterns of an entity employing the system and another entity employing the system. Accordingly, the system may recommend goals and/or policies that have been successful for other related entities.

Manager application 102 may comprise a notifications module 308. Notification module 308 may be effective to provide notifications (e.g., emails, push notifications, SMS messages, etc.) to an administrator and/or to an entity employing the system. Notifications may provide new opportunities and/or status reports on goal completion.

Goals engine 108 may comprise goals manager 310. Goals manager 310 may manage and translate goals provided by goal definition 302 into policies. Goals manager 310 may receive featurized goal data (including target attributes and/or constraints) as input to determine policies and, in some examples, may suggest new goals based on analysis of interaction patterns of users (e.g., user 111). Goals engine 108 may comprise goals optimizer 312. Goals optimizer 312 may comprise one or more machine learning models trained to accept goal data as input from goal definition 302 of manager application 102 and output policies. Policies may be sent to policies engine 110. Policies may specify one or more operations that are to be performed in order to accomplish goals identified through goal definition component 302.

Goals engine 108 may comprise restrictions component 314. Restrictions component 314 may measure current goal success rates and may provide a feedback signal that may be used to retrain machine learning model instances of goals optimizer 312. For example, restrictions component 314 may send a feedback signal to goals optimizer 312 indicating that a search modification operation of a current policy has a success rate that is below a threshold success rate. Accordingly, the feedback signal may be used to retrain a machine learning model of goals optimizer 312 in order to update the policy and/or change the operations of the policy.

Goals engine 108 may comprise goal tracker 316. Goal tracker 316 may monitor data from analytics engine 114 (e.g., feedback data) describing current states of goal completion. Such signals may be used to train/retrain machine learning models of goals optimizer 312. For example, when a signal from goal tracker 316 indicates that a particular goal is nearing completion, machine learning models of goals optimizer 312 may be retrained to favor other goals. Conversely, when a signal from goal tracker 316 indicates that a goal is lagging behind other goals, machine learning models of goals optimizer 312 may be retrained to emphasize the lagging goal. Goal tracker 316 may provide continuous feedback to goals optimizer 312 so that policies may be dynamically updated based on changing conditions. Additionally, goal tracker 316 may send notifications (e.g., upon completion of a goal and/or upon hitting various progress checkpoints) to notifications module 308 of manager application 102 to inform a user of the current progress toward the goal.

Policies engine 110 may comprise a policy manager 318. Policy manager 318 may execute operations to manage current policies provided by goals engine 108. For example, policy manager 318 may include operations to generate inverted indices and/or may include operations that may be used to modify search terms input into a search engine in accordance with the policy. Policy manager 318 may receive current policies from goals engine 108. In various examples, policy manager 318 may interface with policy evaluator 320. Policy evaluator 320 may evaluate the current policies and provide restrictions (e.g., supply restrictions, delivery restrictions, latency restrictions, etc.).

User experience engine 112 may comprise a detail page interface 322. Detail page interface 322 may suggest various options to a user. For example, detail page interface 322 may provide graphics, icons, badges, and/or sounds emphasizing content, in accordance with the current policy. In an example, detail page interface 322 may highlight an item that should be purchased in accordance with a particular goal instituted by the system. As described above, detail page interface 322 may modify content displayed to a user in response to a search to emphasize favored content and/or deemphasize disfavored content. User experience engine 112 may comprise a search modification component 324. As previously described, search modification component 324 may boost various content and/or websites to boost such content in accordance with a current policy and/or goal. In various examples, search modification component 324 may filter search queries in accordance with information included in an inverted index generated by policies engine 110, in order to emphasize particular content and/or web pages. In at least some examples, user experience engine 112 may comprise a recommendation component 326. Recommendation component 326 may recommend particular content and/or websites to a user based on the current policies. The recommendations generated by recommendation component 326 may take a variety of forms. For example, a recommendation may be a top search result, the recommendation may be an audio prompt, the recommendation may comprise a graphics such as highlighting, etc.

Analytics engine 114 may comprise a data aggregator component 328, a data vending component 330, a dash manager 332, and/or a notifications module 334. Data aggregator component 328 may aggregate data indicating user interactions with the user experience engine 112. For example, data aggregator component 328 may aggregate data describing websites visited and/or ignored (from a list of promoted search results), content interacted with, content ignored, whether or not such content was emphasized by recommendation component, etc. In addition, data aggregator component 328 may perform precomputes to segment the data into particular categories. For example, data aggregator component 328 may segment data into time categories (e.g., when the content interaction and/or website visit occurred), attribute categories (e.g., type of content), constraints (e.g., whether the interaction satisfied the constraints of the goal definition 302), etc. Data vending component 330 may provide low latency APIs that allow access to the data calculated by the data aggregator component 328. Data vending component 330 may provide such data as a feedback signal to goals optimizer 312 of goals engine 108. Accordingly, such data may be used to retrain the machine learning models and thereby update the policies on a continuous basis. In various examples, analytics engine 114 may comprise a dash manager 332. Dash manager 332 may be a web component that may provide a pluggable set of analytical dashboards that may be integrated into third party web applications. Additionally, in some further examples, analytics engine 114 may comprise a notifications module that may communicate upstream changes in analytical data.

Figure 4:
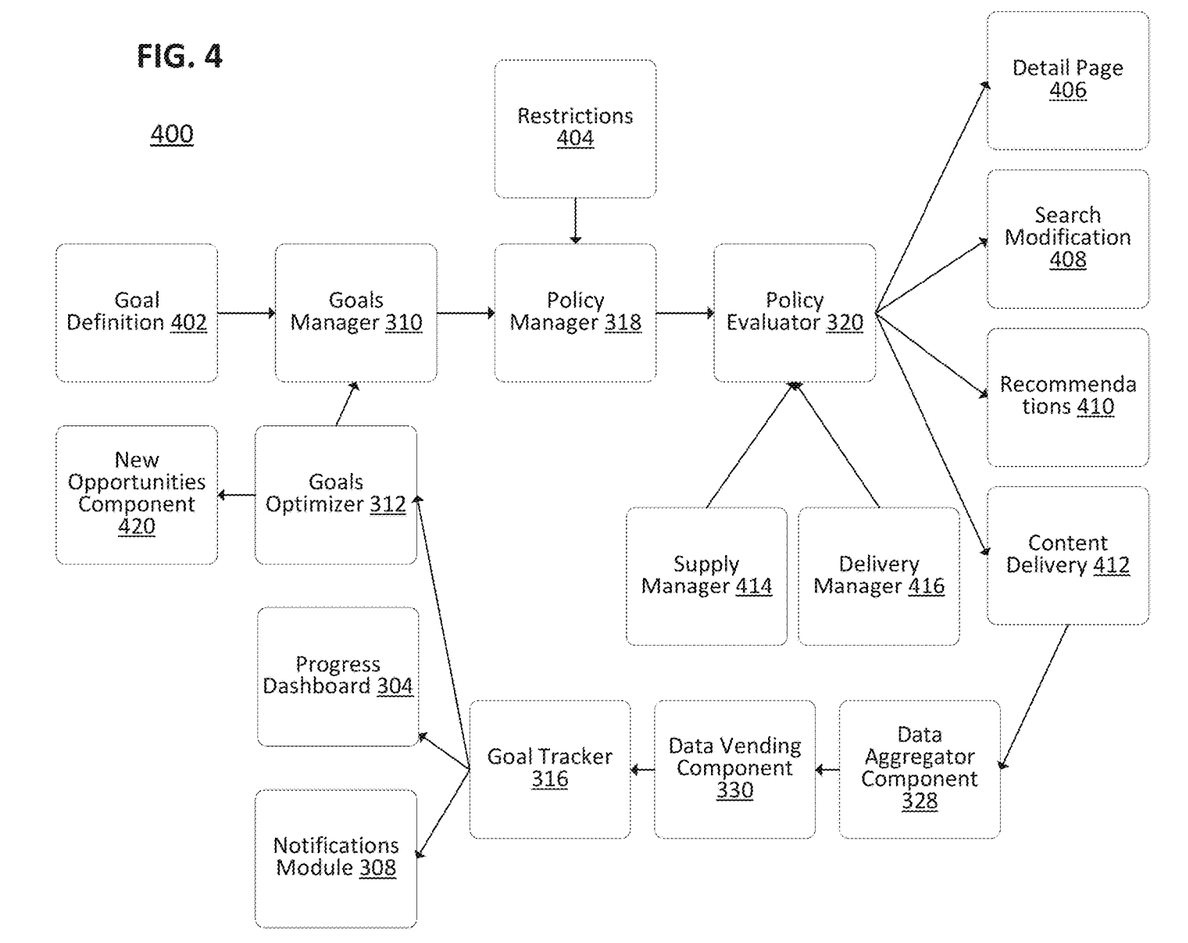
FIG. 4 depicts a flow chart showing an example process for determining and dynamically updating policies based on specified goals, in accordance with various aspects of the present disclosure.

FIG. 4 depicts a flow chart showing an example process for determining and dynamically updating policies based on specified goals, in accordance with various aspects of the present disclosure. Those portions of FIG. 4 that have been previously discussed in reference to FIGS. 1-3 may not be described again for purposes of clarity and brevity. The actions of the flow chart depicted in FIG. 4 may represent a series of instructions and/or operations comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In at least some examples, process 400 of FIG. 4 may begin at goal definition 402. Goal definition 402 may include receiving goal data (e.g., by goal definition component 302 of FIG. 3). Goal definition 402 may include receiving goal data describing attributes of a goal along with constraints for the attributes. Additionally, goal definition 402 may include actions related to the attributes. For example, a goal may be to increase the number of visits to a website by 25% in the next month. Goal data for such a goal may include the attributes "number of visits," "website ID," (e.g., an identification of the subject website) and "25%." Additionally, the goal data may include data representing the relevant action—"increase visits." As previously described the goal data may comprise one or more constraints/restrictions (e.g., increase traffic to website A without the traffic to website B dropping by more than 5%, etc.). As previously described, goal data may be automatically provided through an API (e.g., API 106) and/or may be provided through a user interface (e.g., UI 104) using, for example, a wizard to determine the goal data.

The goal definition 402 including goal data may be sent to goals manager 310. Goals manager 310 may comprise one or more machine learning models effective to receive the goals definition 402 comprising the goal data and/or constraints/restrictions as input and determine at least one computer-executable policy based on the goal definition 402. The computer-executable policies may be provided to policy manager 318. Policy manager 318 may be effective to provide computer-executable instructions and/or operations effective to manage the policies. In at least some examples, policy manager 318 may receive restrictions 404 that may describes the goal success rate and may be used to update the policies.

Policy evaluator 320 may evaluate the current policies in view of the restrictions 404. Policy evaluator 320 may be a low-latency and pluggable system evaluating the policy based on user interaction with the relevant attributes of the goal data (e.g., based on user interaction with content and/or websites indicated by the goal data). In some examples, policy evaluator 320 may receive information from a supply manager 414 and/or a delivery manager 416. Supply manager 414 may provide information regarding supply restrictions on content available on various websites and/or webpages. For example, if a current policy states that content should only be selected if at least 100 units are available, such restriction data may be sent from the supply manager 414 to policy evaluator 320. Delivery manager 416 may provide information regarding delivery restrictions that may affect implementation of a policy. For example, if the policy indicates that delivery of content/items must occur within 1 week and a current website is unable to meet such a limitation, the delivery manager may provide such information to policy evaluator 320.

In at least some examples, the computer-executable policies may perform one or more operations including providing detail page 406, search modification 408, recommendations 410, and/or content delivery 412. Detail page 406 may be a policy operation configured to provide messaging to a user to indicate preferred content and/or web sites in accordance with the current policy/policies. For example, detail page may include graphics and/or audio to explain to the user which content is preferred in order to satisfy the current policies. Search modification 408 may modify user searches according to precomputed inverted indices to emphasize websites and/or content that are in accordance with current policies. Search modification 408 may boost results of search queries through dynamic filtering of the search queries with terms determined using the inverted indices in order to emphasize content and/or websites that are in accordance with current policies. Recommendations 410 may recommend content and/or webpages irrespective of what the user is currently viewing. Content delivery 412 may provide messaging consistent with detail page 406 concerning content that has been selected (and/or sent to a shopping cart, for example).

Data related to user interactions with content and/or websites may be received from the policy-based computer-executable operations (e.g., detail page 406, search modification 408, recommendations 410, and/or content delivery 412) by data aggregator component 328. Data aggregator component 328 may aggregate data indicating user interactions with the user experience engine 112. For example, data aggregator component 328 may aggregate data describing websites visited and/or ignored (from a list of promoted search results), content interacted with, content ignored, whether or not such content was emphasized by recommendation component, etc. In addition, data aggregator component 328 may perform precomputes to segment the data into particular categories. For example, data aggregator component 328 may segment data into time categories (e.g., when the content interaction and/or website visit occurred), attribute categories (e.g., type of content), constraints (e.g., whether the interaction satisfied the constraints of the goal definition 302), etc.

Data vending component 330 may provide low latency APIs that allow access to the data calculated by the data aggregator component 328. Data vending component 330 may provide such data as a feedback signal to goals optimizer 312 of goals engine 108. Accordingly, such data may be used to retrain the machine learning models and thereby update the policies on a continuous basis. In various examples, data vending component 330 may provide data to goal tracker 316.

Goal tracker 316 may monitor data from analytics engine 114 (e.g., feedback data) describing current states of goal completion. Such signals may be used to train/retrain machine learning models of goals optimizer 312. For example, when a signal from goal tracker 316 indicates that a particular goal is nearing completion, machine learning models of goals optimizer 312 may be retrained to favor other goals. Conversely, when a signal from goal tracker 316 indicates that a goal is lagging behind other goals, machine learning models of goals optimizer 312 may be retrained to emphasize the lagging goal. Goal tracker 316 may provide continuous feedback to goals optimizer 312 so that policies may be dynamically updated based on changing conditions. Additionally, goal tracker 316 may send notifications (e.g., upon completion of a goal and/or upon hitting various progress checkpoints) to notifications module 308 of manager application 102 to inform a user of the current progress toward the goal. Notifications module may communicate upstream (e.g., to a systems administrator portal) changes in analytical and/or goal completion data. In various examples, emails, push notifications, etc., may be sent by notifications module 308.

Progress dashboard 304 may provide access to goal completion status and/or progress. Additionally, as previously described, progress dashboard 304 may segment progress data provided by analytics engine 114 so that progress may be viewed for different categories, over different time spans, and/or at different granularities. Goals optimizer 312 may receive feedback data including indications of user interactions with content related to policies and/or goal completion status. Goals optimizer 312 may use such feedback data to train/retrain machine learning models of goals optimizer 312 in order to dynamically update current policies based on realtime feedback data. Back propagation may be used to update parameters of the various machine learning models. In various examples, goals optimizer 312 may send goal completion status and/or feedback data to new opportunities component 420. New opportunities component 420 may comprise an interface for suggesting new goals based on analysis of current feedback data and/or completion status data received from goals optimizer 312.

Figure 5:
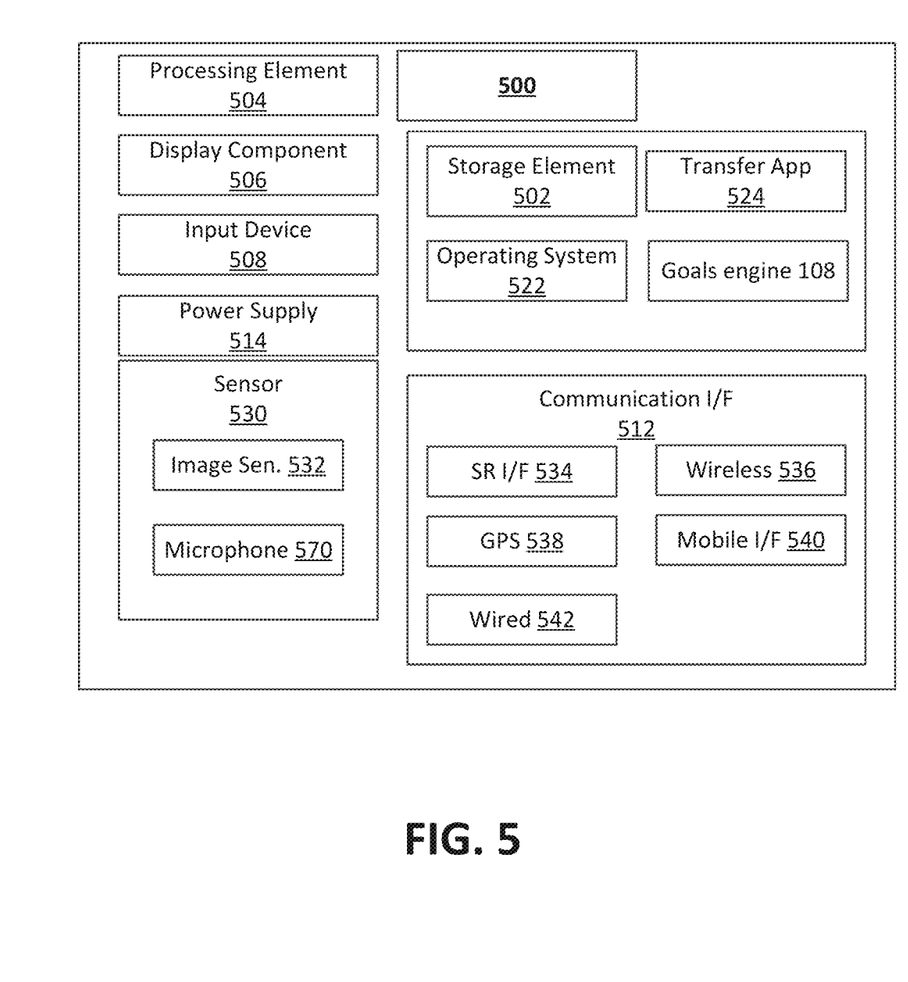
FIG. 5 is a block diagrams showing an example architecture of a computing device that may be used in accordance with various embodiments described herein.

FIG. 5 is a block diagram showing an example architecture 500 of a computing device that may be used to perform dynamic filtering of search queries, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

A goals engine 108 may be effective to perform one or more of the machine learning techniques described herein, such as one or more techniques described above in reference to FIGS. 1-4. For example, goals engine 108 may implement one or more deep neural networks and/or other machine learning models that may be used to determine computer executable policies in response to input goal data and/or feedback data.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 604, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s), as described herein, are exemplary, and may be located as a stand-alone device or may be included, in whole or in part, as a component of a larger device or system.

Figure 6:
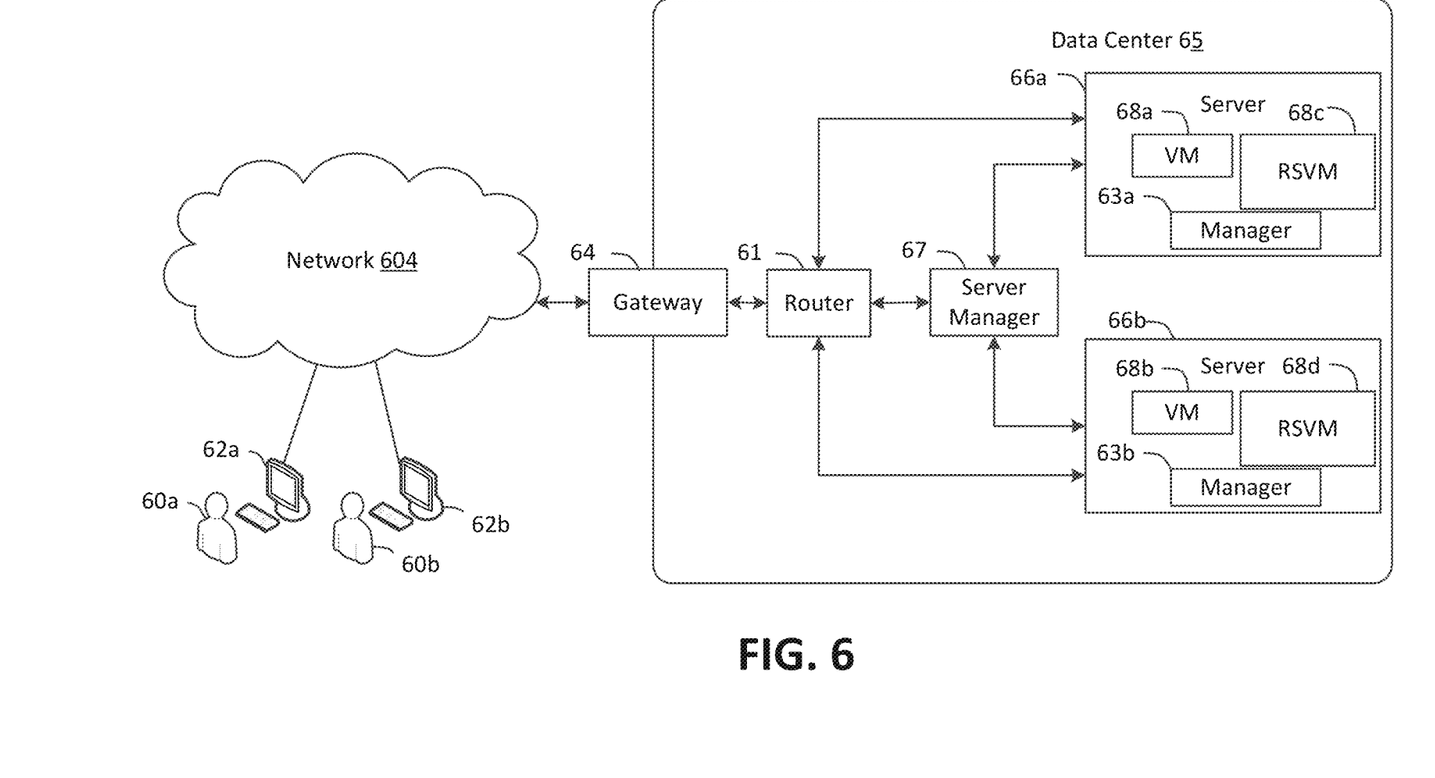
FIG. 6 is a diagram illustrating an example system for sending and providing data that may be used in accordance with the present disclosure.

An example system for determining dynamic computer-executable policies based on goal data will now be described in detail. In particular, FIG. 6 illustrates an example computing environment in which the embodiments described herein may be implemented. For example, the computing environment of FIG. 6 may be used to dynamic policy determination and/or dynamic filtering of search queries as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68*c* and 68*d* are rendition switching virtual machine ("RSVM") instances. The RSVM virtual machine instances 68*c* and 68*d* may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62*a* or 62*b* may be a server, a desktop or laptop personal computer, a tablet computer, a wireless telephone, a personal digital assistant (PDA), an e-book reader, a game console, a set-top box or any other computing device capable of accessing data center 65. User computer 62*a* or 62*b* may connect directly to the Internet (e.g., via a cable modem or a Digital Subscriber Line (DSL)). Although only two user computers 62*a* and 62*b* are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63*a* or 63*b* (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66*a* and 66*b*. Router 61 may also be connected to gateway 64, which is connected to network 604. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66*a* and 66*b*. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method for dynamic filtering of search queries, comprising:
   receiving, at a first user interface, goal data representing a first goal, wherein the goal data indicates a percentage increase in website traffic for a first website over a first time period;
   determining, by a collaborative filtering machine learning model executed on at least one computing device, a first policy for the goal data, wherein the first policy comprises first computer-executable instructions;
   receiving, at a second user interface, a search query;
   modifying the search query according to the first computer-executable instructions to generate a modified search query, wherein the modified search query is effective to return search results related to the first website when executed by a search engine;
   determining first feedback data indicating that a user visited the first website during the first time period;
   sending the first feedback data to the at least one computing device executing the collaborative filtering machine learning model;
   retraining the collaborative filtering machine learning model using the first feedback data to generate an updated collaborative filtering machine learning model; and
   determining, by the updated collaborative filtering machine learning model, a second policy for the goal data.

2. The computer-implemented method of claim 1, wherein the first policy further comprises third computer-executable instructions, the method further comprising:
   generating, according to the third computer-executable instructions, a first graphical icon indicating that first content of the first website is preferred over other content in accordance with the first goal.

3. The computer-implemented method of claim 1, further comprising:
   determining a first completion percentage of the first goal according to a first qualitative attribute;
   determining a second completion percentage of a second goal according to a second qualitative measure, wherein the first completion percentage is higher than the second completion percentage;
   generating second feedback data indicating the first completion percentage of the first goal and the second completion percentage of the second goal;
   retraining the updated collaborative filtering machine learning model to generate a second updated collaborative filtering machine learning model; and
   determining, by the second updated collaborative filtering machine learning model, a third policy for the goal data, wherein the third policy includes third computer-executable instructions effective to emphasize completion of the second goal over completion of the first goal.

4. A method, comprising:
   receiving, by a first computing device, first goal data comprising an identification of first content;
   generating, by a first machine learning model, a first computer-executable policy based at least in part on the first goal data;
   receiving a first search query;
   modifying, by the first computer-executable policy, the first search query to generate a modified search query;
   determining first feedback data related to user interaction with search results of the modified search query;
   updating at least one parameter of the first machine learning model based at least in part on the first feedback data to generate a second machine learning model; and
   generating, by the second machine learning model, a second computer-executable policy.

5. The method of claim 4, further comprising:
   determining progress status data indicating a completion status of the first goal data;

sending second feedback data to the second machine learning model, the second feedback data comprising the progress status data; and
updating at least one parameter of the second machine learning model based at least in part on the second feedback data to generate a third machine learning model.

6. The method of claim 4, further comprising:
generating, by the second machine learning model, the second computer-executable policy based at least in part on the first goal data and the first feedback data;
determining a first operation associated with the second computer-executable policy;
receiving a second search query; and
modifying the second search query using the first operation to generate a second modified search query.

7. The method of claim 6, further comprising:
determining second feedback data indicating a lack of user interaction with a first search result of the second modified search query;
updating at least one parameter of the second machine learning model based at least in part on the second feedback data to generate a third machine learning model; and
generating, by the third machine learning model, a third computer-executable policy based at least in part on the first goal data and the second feedback data.

8. The method of claim 4, further comprising:
receiving, by the first computing device, second goal data;
determining a similarity between the second goal data and the first goal data; and
selecting, by the first computing device, the first machine learning model for the second goal data.

9. The method of claim 4, further comprising:
generating, by first operations of the first computer-executable policy, an inverted index comprising second content and identifiers of websites in which the second content appears, wherein the first machine learning model is effective to output the first operations.

10. The method of claim 4, further comprising:
determining, based at least in part on the first feedback data, a completion status of a goal associated with the first goal data; and
sending an indication of the completion status to a notification module effective to output the completion status.

11. The method of claim 4, further comprising:
determining a first website indicated by the first goal data;
determining the first content indicated by the first goal data; and
generating, by first operations of the first computer-executable policy, a first graphical icon indicating that the first content of the first website is preferred over other content.

12. The method of claim 4, further comprising:
determining a first website indicated by the first goal data; and
modifying the first search query to include a first search term associated with the first website, wherein the first search term is included in an inverted index generated by the first machine learning model.

13. A system comprising:
at least one processor; and
a non-transitory computer-readable memory storing instructions that, when executed by the at least one processor, are effective to program the at least one processor to perform a method comprising:
receiving first goal data comprising an identification of first content;
generating, by a first machine learning model, a first computer-executable policy based at least in part on the first goal data;
receiving a first search query;
modifying, by the first computer-executable policy, the first search query to generate a modified search query;
determining first feedback data related to user interaction with search results of the modified search query;
updating at least one parameter of the first machine learning model based at least in part on the first feedback data to generate a second machine learning model; and
generate, by the second machine learning model, a second computer-executable policy.

14. The system of claim 13, wherein the non-transitory computer-readable memory stores further instructions that, when executed by the at least one processor, are effective to program the at least one processor to perform the method, further comprising:
determining progress status data indicating a completion status of the first goal data;
sending second feedback data to the second machine learning model, the second feedback data comprising the progress status data; and
updating at least one parameter of the second machine learning model based at least in part on the second feedback data to generate a third machine learning model.

15. The system of claim 13, wherein the non-transitory computer-readable memory stores further instructions that, when executed by the at least one processor, are effective to program the at least one processor to perform the method, further comprising:
generating, by the second machine learning model, the second computer-executable policy based at least in part on the first goal data and the first feedback data;
determining a first operation associated with the second computer-executable policy;
receiving a second search query; and
modifying the second search query using the first operation to generate a second modified search query.

16. The system of claim 15, wherein the non-transitory computer-readable memory stores further instructions that, when executed by the at least one processor, are effective to program the at least one processor to perform the method, further comprising:
determining second feedback data indicating a lack of user interaction with a first search result of the second modified search query;
updating at least one parameter of the second machine learning model based at least in part on the second feedback data to generate a third machine learning model; and
generating, by the third machine learning model, a third computer-executable policy based at least in part on the first goal data and the second feedback data.

17. The system of claim 13, wherein the non-transitory computer-readable memory stores further instructions that, when executed by the at least one processor, are effective to program the at least one processor to perform the method, further comprising:
receiving second goal data;
determining a similarity between the second goal data and the first goal data; and selecting the first machine learning model for the second goal data.

18. The system of claim 13, wherein the non-transitory computer-readable memory stores further instructions that, when executed by the at least one processor, are effective to program the at least one processor to perform the method, further comprising:

generating, by first operations of the first computer-executable policy, an inverted index comprising second content and identifiers of websites in which the second content appears, wherein the first machine learning model is effective to output the first operations.

19. The system of claim 13, wherein the non-transitory computer-readable memory stores further instructions that, when executed by the at least one processor, are effective to program the at least one processor to perform the method, further comprising:

determining, based at least in part on the first feedback data, a completion status of a goal associated with the first goal data; and sending an indication of the completion status to a notification module effective to output the completion status.

20. The system of claim 13, wherein the non-transitory computer-readable memory stores further instructions that, when executed by the at least one processor, are effective to program the at least one processor to perform the method, further comprising:

determining a first website indicated by the first goal data;

determining the first content indicated by the first goal data; and generating, by first operations of the first computer-executable policy, a first graphical icon indicating that the first content of the first website is preferred over other content.

* * * * *